United States Patent
Barendrecht (10) Patent No.: US 9,706,706 B2
(45) Date of Patent: Jul. 18, 2017

(54) DEVICE FOR CONTROLLING THE SPEED OF AN ELECTRIC PROPULSION MACHINE AND CORRESPONDING MACHINE

(71) Applicant: FRANCE REDUCTEURS, Les Herbiers (FR)

(72) Inventor: Wouter Barendrecht, Cholet (FR)

(73) Assignee: FRANCE REDUCTEURS, Les Herbiers (FR)

( * ) Notice: Subject to any disclaimer, the term of this patent is extended or adjusted under 35 U.S.C. 154(b) by 0 days.

(21) Appl. No.: 14/786,856

(22) PCT Filed: Apr. 22, 2014

(86) PCT No.: PCT/FR2014/050976
§ 371 (c)(1),
(2) Date: Oct. 23, 2015

(87) PCT Pub. No.: WO2014/174206
PCT Pub. Date: Oct. 30, 2014

(65) Prior Publication Data
US 2016/0081267 A1    Mar. 24, 2016

(30) Foreign Application Priority Data

Apr. 23, 2013   (FR) ...................................... 13 53705

(51) Int. Cl.
*B60L 15/20*     (2006.01)
*A01D 34/00*    (2006.01)
(Continued)

(52) U.S. Cl.
CPC ......... *A01D 34/006* (2013.01); *A01D 34/824* (2013.01); *B60L 15/20* (2013.01); *A01D 2034/6843* (2013.01); *Y02T 10/7258* (2013.01)

(58) Field of Classification Search
CPC combination set(s) only.
See application file for complete search history.

(56) References Cited

U.S. PATENT DOCUMENTS 4,398,889 A * 8/1983 Lam .................. G09B 9/28
                                                    244/223
2002/0005001 A1   1/2002 Yoshida et al.
(Continued)

OTHER PUBLICATIONS

Search Report dated Apr. 2014.

*Primary Examiner* — Edward J Pipala
(74) *Attorney, Agent, or Firm* — Ipsilon USA, LLP (57) ABSTRACT

The invention relates to a control device (2) for controlling a vehicle having an electric motor (1), the control device comprising a control system (21, 22, 23) provided with one or more levers movable between a minimum control position and a maximum control position, and a control unit (3) for controlling the motor. Said control unit (3) includes acquisition means (31) for acquiring a signal representative of the position of said control system, determination means (32) for determining a setpoint speed value corresponding to said acquired signal, as a function of a maximum setpoint speed value associated with the maximum control position, and control means (33) for controlling the motor as a function of the determined setpoint speed. Said control device has adjustment means (34) arranged with the lever(s) of the system to enable the maximum setpoint speed value to be adjusted without taking a hand away from the lever(s). The invention also provides a corresponding vehicle.

16 Claims, 3 Drawing Sheets

(51) Int. Cl.
*A01D 34/82* (2006.01)
*A01D 34/68* (2006.01)

(56) References Cited

U.S. PATENT DOCUMENTS

| | | |
|---|---|---|
| 2010/0064650 A1 | 3/2010 | McCane et al. |
| 2011/0000176 A1 | 1/2011 | Lahey et al. |
| 2012/0061153 A1* | 3/2012 | Porter .................. B62D 11/006 180/6.48 |
| 2013/0081500 A1 | 4/2013 | Helin et al. |
| 2016/0101693 A1* | 4/2016 | Bejcek .................. B60K 26/02 74/473.33 |

* cited by examiner

DEVICE FOR CONTROLLING THE SPEED OF AN ELECTRIC PROPULSION MACHINE AND CORRESPONDING MACHINE

RELATED APPLICATIONS

This application is a National Phase Application of PCT/FR2014/050976, filed on Apr. 22, 2014, which in turn claims the benefit of priority from French Patent Application No. 13 53705 filed on Apr. 23, 2013, the entirety of which are incorporated herein by reference.

BACKGROUND

Field of the Invention:

The present invention relates in general manner to controlling the travel speed of a self-propelled vehicle.

Description of Related Art:

Self-propelled electric lawn movers controlled by a walking driver are known in the state of the art. The travel speed control of such lawn movers usually comprises a lever that is movable over a travel stroke defined between a first end position corresponding to a zero setpoint speed value, referred to as a rest position, and a second extreme position, referred to as maximum control position, corresponding to setting a maximum setpoint speed value. The lever is urged towards the rest position by a spring and the driver can make the vehicle move forwards by moving the lever along its stroke.

Nevertheless, when the driver seeks to cause the vehicle to move forwards at a speed that is not zero but that is less than the maximum speed corresponding to the maximum control position, the driver needs to hold the lever in an intermediate position along its travel stroke, and that is awkward and does not make it easy for the driver to maintain a constant speed since such an intermediate position is unstable, relatively inaccurate compared with the desired speed, and tiring in use for the driver.

OBJECTS AND SUMMARY

An object of the present invention is to provide a speed control device and a corresponding self-propelled vehicle that enable the speed of the vehicle to be controlled more accurately, more reliably, and in a manner that is less tiring for the driver.

To this end, the invention provides a control device for controlling the travel speed of a self-propelled vehicle having a propulsion system, said control device comprising:
  a control system for controlling the travel speed of the vehicle, said control system comprising one, preferably two, control lever(s) manually movable by the driver of the vehicle over a defined stroke between a first end position, referred to as a minimum control position, corresponding to control at a minimum setpoint speed, preferably a zero speed, and a second end position, referred to as a maximum control position, corresponding to control at a maximum setpoint speed; and
  a control unit for controlling the propulsion system;
  the control device being characterized:
    in that said control unit comprises:
      acquisition means for acquiring a signal representative of the position of said control system;
      determination means for determining setpoint speed and suitable for determining a setpoint speed value associated with said acquired signal as a function of a maximum setpoint speed value associated with a signal representative of the maximum control position of the control system; and
      control means for controlling the propulsion system of the vehicle as a function of the determined setpoint speed value;
    in that said control device has adjustment means that are manually actuatable by the driver of the vehicle and that enable the driver of the vehicle to adjust said maximum setpoint speed value associated with said signal representative of the maximum control position of said control system; and
    in that said adjustment means are arranged with the control system in such a manner that with one or both of the levers actuated by a hand of the driver, the adjustment means remain accessible to be actuated by said hand of the driver without the driver needing to let go said control lever.

The possibility of adjusting the maximum setpoint speed value for the vehicle when the movable control system is at the end of its stroke, i.e. in the maximum control position, enables the driver to vary the speed of the vehicle without moving the hands and without becoming tired.

The driver's hands do not become tired maintaining a fixed speed corresponding to the adjusted speed, and speed variation can be controlled more accurately by the driver over the travel stroke of the movable control system.

Because of the way the adjustment means are arranged close to the speed control system, in particular close to the lever(s), thereby enabling the driver to act on the adjustment means while keeping one or both hands on the control system, the driver can modify the maximum setpoint speed value without letting go of the control system, and thus without stopping the vehicle.

Specifically, and as described in detail below, the driver can bring the lever(s) of the control system into the maximum control position (100%) against the bar of the handle and then use a thumb on one or both hands to act on said adjustment means in order to decrease or increase the setpoint speed value allocated to the maximum control position.

Such a control device makes it possible on a self-propelled vehicle to benefit from a speed limiter function while maintaining the possibility of instantly modifying the maximum setpoint speed value of the vehicle.

In particular, when the vehicle is electrically propelled, such an electronic control formed by the control device of the invention makes it possible to eliminate mechanical cables for operating a clutch or for varying speed, thus reducing wear of the control components.

According to an advantageous characteristic of the invention, said vehicle includes a handle with a bar extending along an axis substantially parallel to the ground support plane of the vehicle and in a direction that is substantially orthogonal to the forward direction of the vehicle, and said control device includes means for fastening it to the bar of the handle and configured in such a manner that the adjustment means are arranged on one side of the axis of the bar of the handle and said control system is arranged on the other side of the axis of the bar of the handle.

Advantageously, said adjustment means are arranged on the driver side of the bar, i.e. on the side of the bar that faces towards the rear of the vehicle, while the lever(s) is/are arranged on the opposite side, i.e. in front of the bar.

Thus, one or both levers can be held clamped against the bar of the handle by the driver applying a hand against the lever, while the driver can use the thumb of that hand to act on the adjustment means in order to increase or decrease the maximum setpoint speed value. In other words, the lever(s) and the adjustment means are arranged in such a manner that the adjustment means can be actuated by the hand that is holding the lever against or towards the handle, thereby limiting driver muscle fatigue since the driver can keep a wrist in a stable position (maximum control position) while making use of the handle, and while still being in a position to modify this speed, since the adjustment means, e.g. one or more adjustment buttons, remain accessible to the driver.

In an embodiment, the adjustment means comprise a pair of adjustment elements, one of which enables the maximum setpoint speed value to be reduced, and the other of which enables it to be increased.

Each adjustment element may be of the pushbutton type, the touch sensitive button type, or the knob type. Provision may also be made for said adjustment means to comprise a single element when that element can be acted on so as to lower the speed and so as to increase the speed, such as a knob.

In an embodiment, said device includes a housing having a longitudinal axis on either side of which said control system extends, and said elements of the pair are arranged on either side of said longitudinal axis of the housing.

Said longitudinal axis of the housing is also parallel to the forward direction of the vehicle when it is in its state fastened on the vehicle of the device. The forward direction corresponds to the direction in which the vehicle is propelled when its wheels are in straight alignment. Advantageously, the control system comprises one lever extending on one side of the longitudinal axis of the housing and another lever extending on the other side.

In another embodiment, said device comprises a housing presenting a longitudinal axis on either side of which said control system extends, and the adjustment means comprise an additional pair of adjustment elements, one of the pairs being situated on one side of the longitudinal axis of the device, and the other pair on the other side of said longitudinal axis of the device.

Such a design of the adjustment means makes it possible with one hand, whether right or left, to cause the speed to be increased or decreased by virtue of positioning each pair of adjustment elements within range of one hand.

According to an advantageous characteristic of the invention, the control unit is configured in such a manner that the setpoint speed is a linear function of the position of said control system.

According to an advantageous characteristic of the invention, the distance measured along the axis of the bar of the handle of the vehicle, between the middle of the working portion of one of the levers that is to be gripped by the driver and the adjustment element of the adjustment means closer to said lever lies in the range 6 centimeters (cm) to 14 cm.

According to an advantageous characteristic of the invention, said adjustment means are situated, in projection onto the axis of the bar of the handle, between the two control levers.

According to an advantageous characteristic of the invention, the distance measured along the forward axis of the vehicle, between the adjustment means and the control lever(s) in the maximum control position lies in the range 0 to 7 cm.

According to an advantageous characteristic of the invention, said signal acquisition means comprise a magnetic field sensor, and said control system comprises a magnetic element movable by the or each control lever relative to said magnetic field sensor from a maximum speed control position to a minimum speed control position.

According to an advantageous characteristic of the invention, said control device includes means for displaying information, such as the maximum setpoint speed.

According to an advantageous characteristic of the invention, said vehicle includes a steering handle, and said control device includes means for fastening it to the handle of said vehicle.

According to an advantageous characteristic of the invention, said device includes means for measuring data representative of the travel speed of the vehicle, and regulator means for regulating the travel speed of the vehicle as a function of said measured speed, said regulator means being configured to maintain the travel speed of the vehicle at the setpoint value corresponding to the control position of the manually movable control system.

The invention also provides a self-propelled vehicle including a propulsion system and a speed control device, the vehicle being characterized in that said control device is as described above.

According to an advantageous characteristic of the invention, the device is fastened lengthwise in the middle of the bar of the handle.

Advantageously, said vehicle propulsion system comprises either an electric motor, or an engine and an electric actuator arranged to control the engine or arranged downstream from the engine to vary or regulate the speed of the travel means of the vehicle, e.g. formed by wheels, said electric motor or said electric actuator being controllable by said control means.

The invention also provides a method of controlling the travel speed of a vehicle as described above, said method being characterized in that it comprises the following steps:
the driver adjusting the maximum setpoint speed value that is associated with the maximum control position of the lever(s) of the control system; and
moving one or both levers of the control system over its travel stroke to a position in which the control unit determines the setpoint speed as a function of the position of said control system and of the adjusted maximum setpoint speed value.

According to an advantageous characteristic of the invention, while the driver has one hand pressed against a lever of the control system in order to maintain a given control position, e.g. a maximum speed control position, said method further comprises the following step:
the driver acting on the adjustment means with one or both hands, said or each hand remaining pressed against the lever so as to modify the maximum setpoint speed value associated with the maximum control position; and
the control unit determining a new setpoint speed value as a function of the held control position of the lever and of the modified maximum setpoint speed value.

BRIEF DESCRIPTION OF THE DRAWINGS

The invention can be better understood on reading the following description of embodiments given with reference to the accompanying drawings, in which.

DETAILED DESCRIPTION

With reference to the figures, and as mentioned above, the invention relates to a control device 2 for controlling the travel speed of a self-propelled wheeled vehicle. The travel speed may also be referred to as the propulsion speed (forwards or backwards).

In the example shown in the figures, said vehicle has a propulsion system that includes an electric motor 1 for driving the wheels of the vehicle in rotation.

In a variant, said propulsion system may have a motor of some other type, for example a fuel-burning engine with an electric actuator arranged to control the engine or to vary or regulate speed downstream from the engine. In particular, said electric actuator may be a cylinder or a solenoid valve. Depending on the type of vehicle, said electric actuator may act on a lever or a fork for operating a clutch or for varying speed.

Thus, the following description in which the propulsion system comprises an electric motor 1 controlled by the control unit 3 of the control device 2, is also applicable to an electric actuator of a propulsion system comprising an engine, e.g. a fuel-burning engine, with an electric actuator arranged to vary or regulate the speed of vehicle travel means, e.g. formed by wheels, by taking action downstream from the motor.

Such a device for controlling the travel speed of the vehicle enables the speed of the front and/or rear wheels of said vehicle to be controlled in order to cause it to move forwards or backwards at a speed that can be adjusted by the driver, as described in detail below.

Said vehicle may be a vehicle having a walking driver, the vehicle being propelled by an electric motor, e.g. a vehicle of the lawn mower or baby carriage type. Said vehicle could also be a golf caddie.

Said control device 2 comprises a control system 21, 22, 23 that is continuously movable relative to the chassis of the vehicle over a defined travel stroke between a first end position, referred to as the minimum control position, corresponding to being controlled at a minimum setpoint speed, preferably zero speed, and a second end position, referred to as the maximum controlled position, corresponding to speed being controlled at a maximum setpoint.

Said control device also includes a control unit 3 for controlling the motor, which unit comprises acquisition means 31 for acquiring a signal representative of the position of said control system 21, 22, 23, and determination means 32 for determining a setpoint speed value that corresponds to said acquired signal. Said setpoint speed value is determined as a function of a maximum setpoint speed value (adjustable by the driver as described in detail below) associated with a signal representative of the maximum control position of the control system. The control unit also has control means 33 for controlling the motor 1 that are configured to control the motor of said vehicle in order to reach said setpoint speed.

Adjustment means 34 enable the driver of the vehicle to adjust the value of said maximum setpoint speed associated with said signal representative of the maximum control position of said control system 21, 22, 23. Said adjustment means 34 are arranged with the control system 21, 22, 23 so as to be accessible to the driver's hands, at least in the maximum control position, i.e. when the driver is manually holding said control system in the maximum control position. Preferably, the arrangement is such that the drive can actuate said adjustment means and take hold of the or each lever regardless of the corresponding control position, and in particular even in the minimum control position, without the driver needing to let go of the control system.

The control unit 3 may be made using an electronic card providing electronic control. The electronic card centralizes information in order to control as well as possible the electric motor used for propelling the vehicle. The electronic card has a plurality of electronic elements suitable for performing the following functions, as described in detail below:

controlling the electric motor 1;
displaying information on a screen 4; and
interacting with the driver by means of the speed control system and of two buttons 341 and 342 for adjusting the maximum speed value.

The determination values 32 for determining a setpoint speed value corresponding to said acquired signal are configured in such a manner that the setpoint speed value that is to be determined varies linearly with the position of said control system 21, 22, 23 along its travel stroke. The position of the control system corresponds to the position of one or both levers 21, 22 of said system, or indeed to the position of the magnetic element 23, as described in detail below.

In other words, the setpoint speed from which the motor 1 is controlled by the control means 33 of the unit 3 is proportional to the length of the travel stroke followed by the control system (i.e. the levers 21, 22 or the element 23 as described in detail below) from their rest position to the position into which said control means are taken by the driver.

Figure 4:
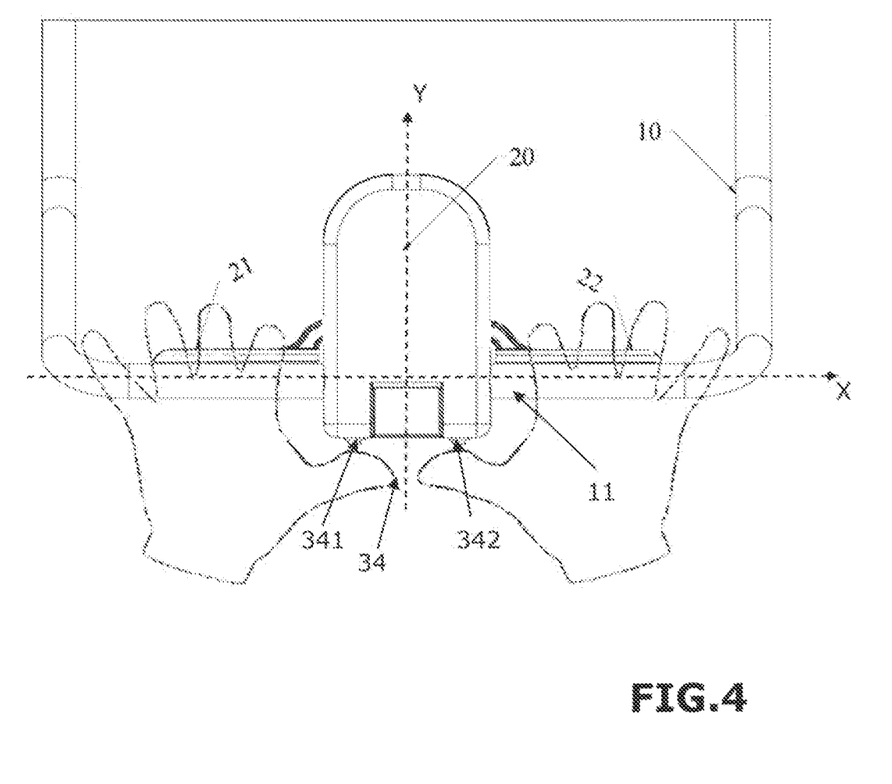
FIG. 4 is a diagrammatic plan view of the device of the invention fastened to the handle of the vehicle, with the driver's hands actuating the levers of the speed control system and the means for adjusting the value of the maximum speed being actuatable by the thumbs of either of the driver's hands.

In the example shown in the figures, said signal acquisition means 31 comprise a magnetic field sensor. The sensor 31 serves to detect the magnetic field emitted by said magnetic element 23, which is representative of the position of the magnetic element 23, and thus of the position of one or both levers 21, 22. As shown in FIG. 4, said magnetic element 23 comprises two permanent magnets 231 and 232.

In the example shown in the figures, said control system 21, 22, 23 has two control levers 21, 22 that are mounted to pivot in opposite directions, independently of each other, and that can be moved manually by the driver of the vehicle between a minimum speed control position (0%) and a maximum speed control position (100%).

Said control system 21, 22, 23 also includes a magnetic element 23 that is movable by each of the control levers 21, 22 relative to said magnetic field sensor 31, from a minimum speed control position (0%) to a maximum speed control position (100%).

Each of the levers 21, 22 and the element 23 are urged towards the minimum control position by respective springs (not shown).

Movement of the magnetic element 23 is controlled by the movement of the levers so that when one or both levers are in the maximum speed control position (100%), the magnetic element 23 is also in the maximum speed control position (100%), which is detected by the sensor 31 of the control unit 3. The electric motor 1 is then controlled as a function of the setpoint speed value that is given to this maximum speed control position (100%), and that can be adjusted by the driver, as described below.

Each control lever is pivotally mounted via a respective pivot connection 210, 220, and the magnetic element 23 is movable in straight line translation.

Thus, each control lever serves to provide the connection between one or both hands of the driver of the motor-driven vehicle and the control unit of the motor. As mentioned above, the two levers are independent of each other, and they are designed to be capable of enabling the speed of the vehicle to be controlled by one or both hands.

Said control device may include display means for displaying information about said vehicle, such as the maximum setpoint speed, the duration of operation, the speed of the vehicle, the state of charge of its battery. Said display means include a monitor screen.

The monitor screen is positioned close to the control system and thus within reach of the driver. In particular, the control device has a support frame 20. Said support frame 20 is in the form of a housing containing the control unit 3 and a portion of the control system. The housing 20 houses in particular the magnetic element 23 and carries the screen 4. The control levers 21 and 22 project from the housing.

In the example shown in the figures, said adjustment means 34 comprise two adjustment elements 341 and 342, e.g. buttons, one serving to decrease and the other serving to increase the maximum setpoint speed. Other types of adjustment means may be envisaged. Thus, the speed selection buttons enable the driver to modify the maximum speed of the vehicle by means of pulses when one or both control levers are pressed against the handle of the moving machine. Said modification means 34 also comprise a module 340 for modifying the setpoint value as a function of the operation of each of the buttons.

Said vehicle has a steering handle 10 comprising a bar 11 and said control device has means for fastening it to the bar 11 of the handle 10 of said vehicle. The bar 11 is situated at the rear of the vehicle and the driver takes up position behind the bar 11, i.e. away from the front of the vehicle. In particular, the housing 20 of said control device is fastened to the bar 11 of the handle. The levers 21 and 22 extend in the proximity of the bar 11 of the handle 10 so that the driver can hold one or both levers 21, 22 in the maximum control position by pressing it against the handle 10. The driver can thus hold one or both levers by hand in the maximum control position and can hold the bar of the handle towards which the lever is being held, while still being capable of actuating the adjustment means in order to modify the value of the maximum setpoint speed. The driver can thus vary speed without changing the position of the lever and can do so in highly reliable manner since the driver can hold the or each lever against the bar of the handle.

The bar 11 extends along an axis X that is substantially parallel to the ground support plane of the vehicle and in a direction that is substantially orthogonal to the forward direction of the vehicle, as considered when the wheels of the vehicle are in straight-ahead alignment, i.e. on the longitudinal axis of the vehicle.

The adjustment means 34 are arranged on one side of the axis X of the bar 11 of the handle, preferably on the side that is to be held by the driver, and said control system 21, 22, 23, and in particular the set of levers, is arranged on the other side of the axis X of the bar 11 of the handle.

Thus, the electronic control device 2 is installed on the bar 11 of the handle of the vehicle so as to make utilization simple and grip obvious for the driver. The monitor screen 4 is positioned towards the top and faces the driver so as to make information easier to read. The buttons are placed facing the driver at thumb level so as to enable the speed range to be modified without moving the hands.

Thus, the setpoint speed value associated with the maximum position is adjustable by the driver so as to cause the vehicle to advance at a given speed value, and the driver can adjust the maximum speed value to this given speed value and can hold one or both levers in the maximum control position against the handle, thus avoiding tiring the driver and enabling a regular speed to be maintained. With a maximum speed value adjusted to a small value, the driver continues to benefit from the same travel stroke of the lever and thus from greater accuracy in speed values along its stroke.

The driver can thus move one or both levers against the handle and keep one or both hands closed on the corresponding lever while using a thumb to adjust the maximum setpoint speed to the desired value.

Figure 1:
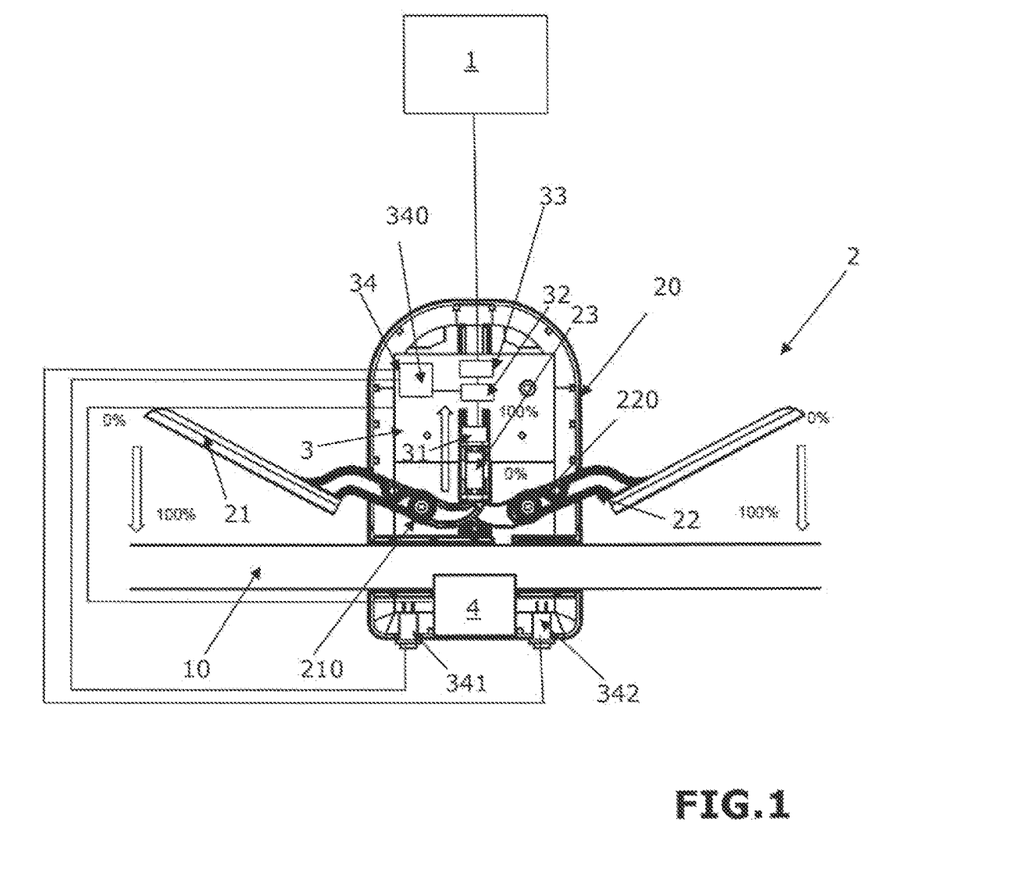
FIG. 1 is a diagrammatic view of a control device of the invention positioned on a steering handle of an electrically propelled wheeled vehicle, with the housing of the control device in the open state.
Figure 2:
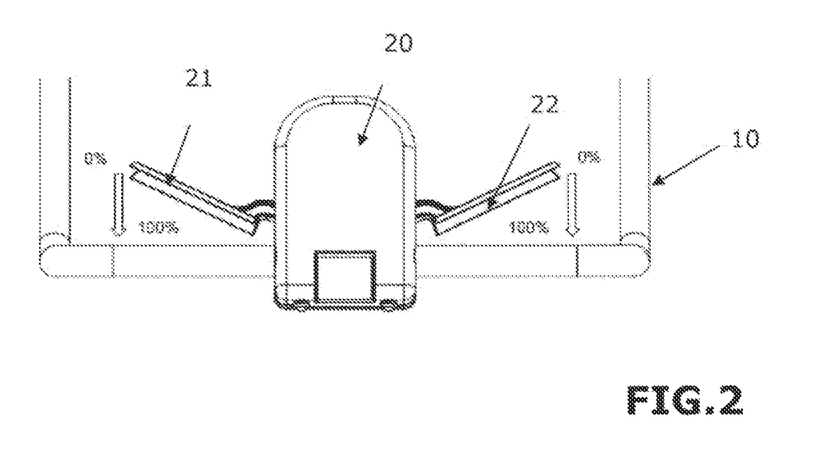
FIG. 2 is a diagrammatic view of the FIG. 1 control device with the housing of the control device in the closed state.
Figure 3:
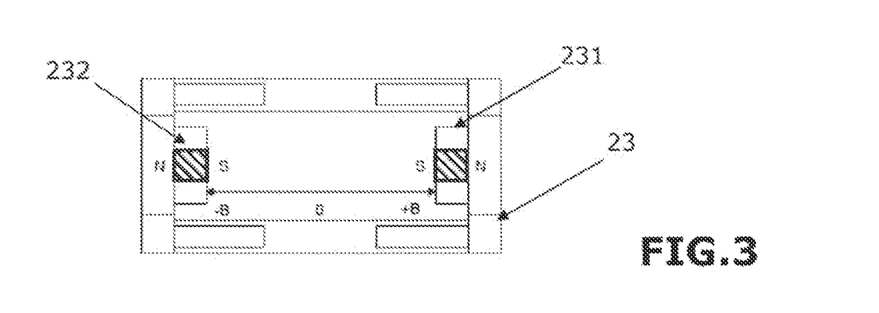
FIG. 3 is a diagrammatic plan view of a magnetic element of the movable control system of the FIG. 1 control device.

The driver can vary the speed of the engine between a zero speed and the adjusted value by gripping the levers more or less strongly. As shown in FIGS. 1 and 2, the setpoint speed may vary over the range 0% to 100% of the maximum setpoint speed as defined by the driver using the two buttons 341 and 342.

By gripping each control lever more or less strongly, the driver moves the magnetic element 23 linearly, which magnetic element has two magnets 231 and 232 of remanence B that are arranged in opposite directions, i.e. with the north and south sides of the magnets facing each other.

In this way, it is possible to generate a magnetic field between −B and +B between the two magnets. The sensor 31 is of inductive type and serves to measure the field between the two magnets 231 and 232. By moving the movable magnetic element 23 that is movable with one or both levers, the magnetic field at the center 31 is varied. The signal corresponding to this magnetic field makes it possible to estimate the position of the movable magnetic element 23 and thus of one or both levers. The movement sensor as formed in this way does not suffer wear because there is no contact.

The signal corresponding to this magnetic field is analyzed by the control unit 3 in order to determine the corresponding setpoint speed, as described below, and the motor is controlled accordingly.

Said vehicle may include speed measurement means, such as a sensor for sensing the speed of the wheels of the vehicle. The speed measurement means may thus be arranged with the transmission of the vehicle in order to determine the speed of the vehicle for the purpose of servo-controlling the speed of the vehicle to the setpoint speed. Said vehicle has regulator means for regulating the speed of the vehicle as a function of the measured speed and said regulator means are configured to maintain the speed of the vehicle at the setpoint speed corresponding to the position of the manually movable control system. Said regulator means may be embodied in the form of an electronic and/or computer module included in the control unit.

It is thus possible to control the speed of the vehicle in an open loop, i.e. without monitoring measurements, or in a closed loop, as described above, i.e. with monitoring measurements, as a function of the position of the or both levers.

The present invention is not limited in any way to the embodiments described and shown, and the person skilled in the art knows how to apply any variant thereto in accordance with its spirit.

The invention claimed is:

1. A control device for controlling the travel speed of a self-propelled vehicle having a propulsion system, said control device comprising:
   a control system for controlling the travel speed of the vehicle, said control system comprising one or two control lever(s) manually movable by the driver of the vehicle over a defined stroke between a first end position, referred to as a minimum control position, corresponding to control at a minimum setpoint speed, preferably a zero speed, and a second end position, referred to as a maximum control position, corresponding to control at a maximum setpoint speed; and
   a control unit for controlling the propulsion system;
   the control unit of the control device has:
   acquisition means for acquiring a signal representative of the position of said control system;
   determination means for determining setpoint speed and suitable for determining a setpoint speed value associated with said acquired signal as a function of a maximum setpoint speed value associated with a signal representative of the maximum control position of the control system; and
   control means for controlling the propulsion system of the vehicle as a function of the determined setpoint speed value; and
   in that said control device has adjustment means that are manually actuatable by the driver of the vehicle and that enable the driver of the vehicle to adjust said maximum setpoint speed value associated with said signal representative of the maximum control position of said control system; and
   in that said adjustment means are arranged with the control system in such a manner that with said one or two control levers actuated by one or both of hand(s) of the driver, the adjustment means remain accessible to be actuated by one or each thumb of one or both of said hands of the driver without the driver needing to let go said control levers,
   wherein the adjustment means are arranged on the side of the axis of the bar of the handle that is to be held by the driver, said one or two control levers being arranged on the other side of the axis of the bar of the handle.

2. A device according to claim 1, wherein said vehicle includes a handle with a bar extending along an axis substantially parallel to the ground support plane of the vehicle and in a direction that is substantially orthogonal to the forward direction of the vehicle, and said control device includes means for fastening it to the bar of the handle and configured in such a manner that the adjustment means are arranged on one side of the axis of the bar of the handle and said control system is arranged on the other side of the axis of the bar of the handle.

3. A device according to claim 1, wherein the adjustment means comprise a pair of adjustment elements, one of which enables the maximum setpoint speed value to be reduced, and the other of which enables it to be increased.

4. A device according to claim 3, wherein said device includes a housing having a longitudinal axis on either side of which said control system extends, and said elements of the pair are arranged on either side of said longitudinal axis of the housing.

5. A device according to claim 3, wherein said device comprises a housing presenting a longitudinal axis on either side of which said control system extends, and the adjustment means comprise an additional pair of adjustment elements, one of the pairs being situated on one side of the longitudinal axis of the device, and the other pair on the other side of said longitudinal axis of the device.

6. A device according to claim 1, wherein the control unit is configured in such a manner that the setpoint speed is a linear function of the position of said control system.

7. A device according to claim 2, wherein the distance measured along the axis of the bar of the handle of the vehicle, between the middle of the working portion of the one or two control levers that is to be gripped by the driver and the adjustment element of the adjustment means closer to said control lever lies in the range 6 cm to 14 cm.

8. A device according to claim 2, wherein said adjustment means are situated, in projection onto the axis of the bar of the handle, between the two control levers.

9. A device according to claim 1, wherein the distance measured along the forward axis of the vehicle, between the adjustment means and the control lever(s) in the maximum control position lies in the range 0 to 7 cm.

10. A device according to claim 1, wherein said signal acquisition means comprise a magnetic field sensor, and in that said control system comprises a magnetic element movable by the or each control lever relative to said magnetic field sensor from a maximum speed control position to a minimum speed control position.

11. A device according to claim 1, wherein said device includes means for measuring data representative of the travel speed of the vehicle, and regulator means for regulating the travel speed of the vehicle as a function of said measured speed, said regulator means being configured to maintain the travel speed of the vehicle at the setpoint value corresponding to the control position of the control system.

12. A self-propelled vehicle including a propulsion system and a speed control device, the vehicle being characterized in that said control device is according to claim 1.

13. A vehicle according to claim 12, wherein said vehicle includes a handle with a bar extending along an axis substantially parallel to the ground support plane of the vehicle and in a direction that is substantially orthogonal to the forward direction of the vehicle, and
   wherein speed control device includes means for fastening it to the bar of the handle and configured in such a manner that the adjustment means are arranged on one side of the axis of the bar of the handle and said control system is arranged on the other side of the axis of the bar of the handle,
   wherein the device is fastened lengthwise in the middle of the bar of the handle.

14. A vehicle according to claim 12, wherein said vehicle propulsion system comprises either an electric motor, or an engine and an electric actuator arranged to control the engine or arranged downstream from the engine to vary or regulate the speed of the travel means of the vehicle, said electric motor or said electric actuator being controllable by said control means.

15. A method of controlling the travel speed of a vehicle in accordance with claim 12, wherein the method comprises the following steps:
   the driver adjusting the maximum setpoint speed value that is associated with the maximum control position of the one or two control lever(s) of the control system; and
   moving one or both of the one or two control levers of the control system over its travel stroke to a position in which the control unit determines the setpoint speed as a function of the position of said control system and of the adjusted maximum setpoint speed value.

16. A method according to claim 15, wherein, while the driver has one or each of his hands pressed against said one or two control lever(s) in order to maintain a given control position, said method further comprises the following step:

the driver acting on the adjustment means with one or each thumb of one or both his hands remaining pressed against said one or two control levers so as to modify the maximum setpoint speed value associated with the maximum control position; and the control unit determining a new setpoint speed value as a function of the held control position of the lever and of the modified maximum setpoint speed value.

* * * * *